United States Patent [19]
Kalandek et al.

[11] Patent Number: 5,938,232
[45] Date of Patent: *Aug. 17, 1999

[54] FORCE DIRECTING AIR BAG DEPLOYMENT POCKET

[75] Inventors: Bruce A. Kalandek, Dearborn; Brian J. Bailey, Sterling Heights; Michael R. Dillon, Clarkston; Shakir M. Salmo, Madison Heights; Pongdet P. Wipasuramonton, Rochester, all of Mich.

[73] Assignee: Breed Automotive Technology, Inc., Lakeland, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/957,220

[22] Filed: Oct. 24, 1997

[51] Int. Cl.⁶ .................................................. B60R 21/22
[52] U.S. Cl. ..................................... 280/730.2; 280/728.3
[58] Field of Search .......................... 280/730.1, 730.2, 280/728.3, 728.2

[56] References Cited

U.S. PATENT DOCUMENTS

| | | | |
|---|---|---|---|
| 5,498,030 | 3/1996 | Hill et al. | 280/728.1 |
| 5,678,853 | 10/1997 | Maly | 280/743.1 |
| 5,749,597 | 5/1998 | Saderholm | 280/728.2 |
| 5,762,363 | 6/1998 | Brown et al. | 280/730.2 |

*Primary Examiner*—Paul N. Dickson
*Attorney, Agent, or Firm*—Markell Seitzman

[57] ABSTRACT

A force-directing air bag deployment system comprising:

a seat (20) having at least one forwardly extending wing (27), the seat (20) covered by a covering material (50), the covering material (50) defining at least one seam which runs vertically along a forward edge of the wing (27), the covering material (50) comprising an outboard side panel (50a) and an inboard side panel (50b) joined at the seam (26);

a first reinforcement panel (60) positioned adjacent the outboard side panel 50a and joined to the panels (50a, 50b) at the seam (26);

a second reinforcement panel (61) adjacent the inboard side panel (50d) and joined to the outboard panel (50a), the inboard panel (50b) and the first reinforcement panel (60) at the seam (26);

the first and second reinforcement panels having respective end portions, each of the end portions are joined together by connectors (94,95) thereby forming the first and second reinforcement panels into a general loop configuration which when subjected to tensile forces, focuses reaction forces into the seam (26) causing the seam to separate.

8 Claims, 5 Drawing Sheets

FORCE DIRECTING AIR BAG DEPLOYMENT POCKET

BACKGROUND AND SUMMARY OF THE INVENTION

The present invention generally relates to side impact air bag systems and more particularly to an apparatus which causes a seam located within a wing of a seat to open on a consistent and more efficient basis.

It is an object of the present invention to more effectively control the way an air bag deploys through a seat to protect an occupant in a side impact collision. Accordingly the invention comprises: a force-directing air bag deployment system comprising a seat having at least one forwardly extending wing. The seat is covered by a covering material, the covering material defining at least one seam which runs vertically along a forward edge of the wing. The covering material comprises an outboard side panel and an inboard side panel joined at the seam. A first reinforcement panel is positioned adjacent the outboard side panel and is joined to the outboard panel at the seam. A second reinforcement panel is located adjacent the inboard side panel and joined to the inboard side panel, the outboard side panel and the first reinforcement panel at the seam. The first and second reinforcement panels have respective end portions, each of the end portions is joined together by a connecting link thereby forming the first and second reinforcement panels into a general loop configuration (about an air bag module) which when subjected to tensile forces, focuses reaction forces (generated upon inflation of an air bag) into the seam, causing the seam to separate.

Many other objects and purposes of the invention will be clear from the following detailed description of the drawings.

DETAILED DESCRIPTION OF THE DRAWINGS

Figure 1:
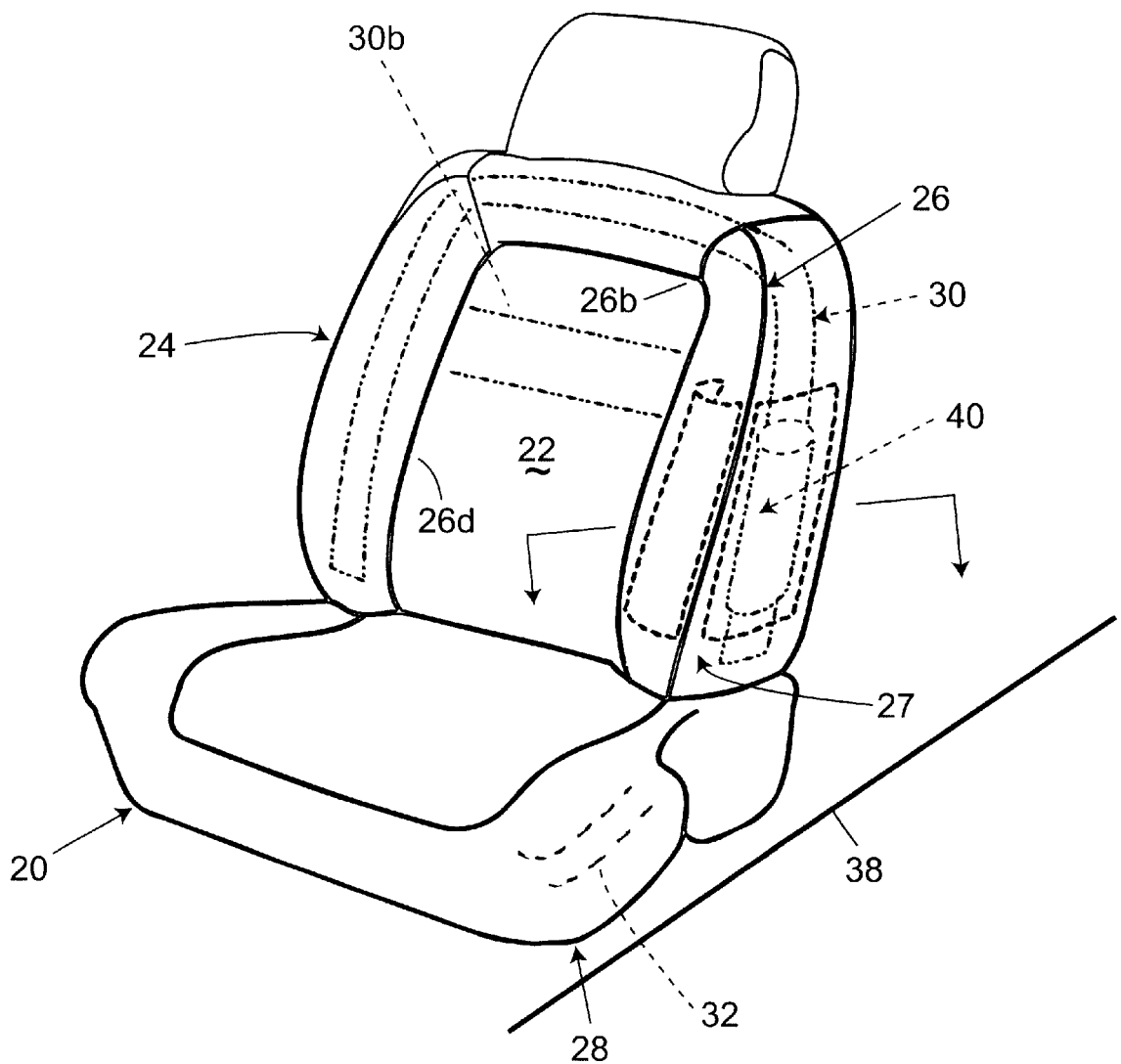
FIG. 1 illustrates a typical automotive seat and shows the location of a side impact air bag module within an outboard wing of the seat.

Reference is briefly made to FIG. 1 which illustrates a typical automotive seat 20. This seat comprises a seat back 22 and an inner 24 and outer 27 wing. The seat also includes a seat bottom or cushion 28. As is known in the art, seat 20 includes an upper frame 30 and a lower frame 32 which is covered by a layer of foam. The foam is then covered by an outer covering material, such as woven cloth, leather, etc. Located within a pocket 34 of the foam and secured to a portion of the frame 30 is a side impact air bag module 40. This module 40 typically comprises a housing which is attached to the frame, an inflator and an air bag. Each side wing or bolster 24 and 27 is typically manufactured of at least two pieces of material defining a vertically oriented seam which is generally positioned toward the front outboard side of the wing adjacent the side of the vehicle 38. In the prior art it was hoped that the expanding air bag would rip the vertical seam 26 so that the air bag would expand through an opening that was precisely located relative to the mounting orientation of the air bag. This has proved not to be the case as the air bag causes the covering material to rip at locations other than the relatively strong and reinforced seam.

Figure 2:
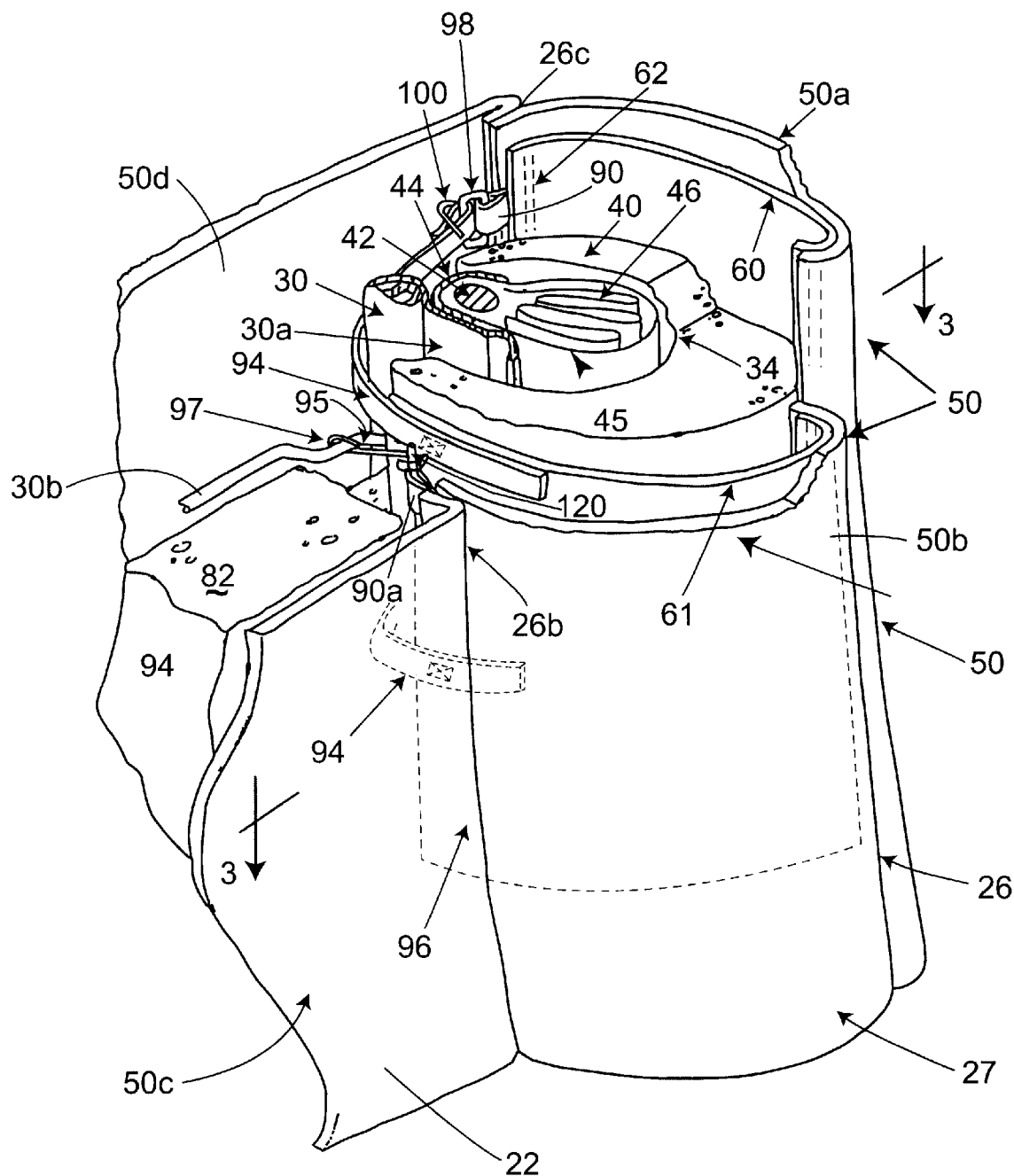
FIG. 2 illustrates a partial left side isometric view of a portion of a seat wing and back.
Figure 3:
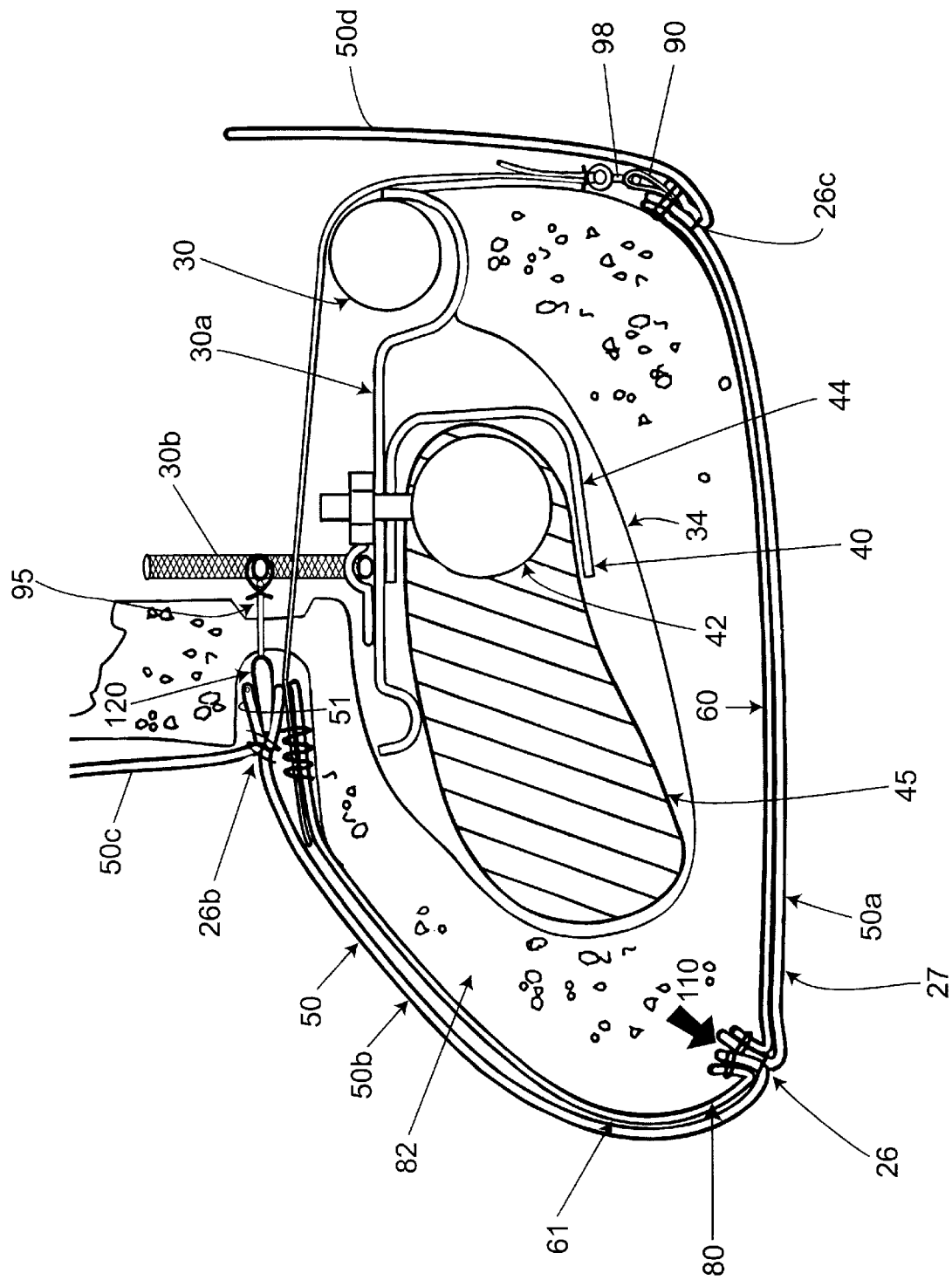
FIG. 3 illustrates a cross-sectional view taken through section line 3—3 of FIG. 2.
Figure 4:
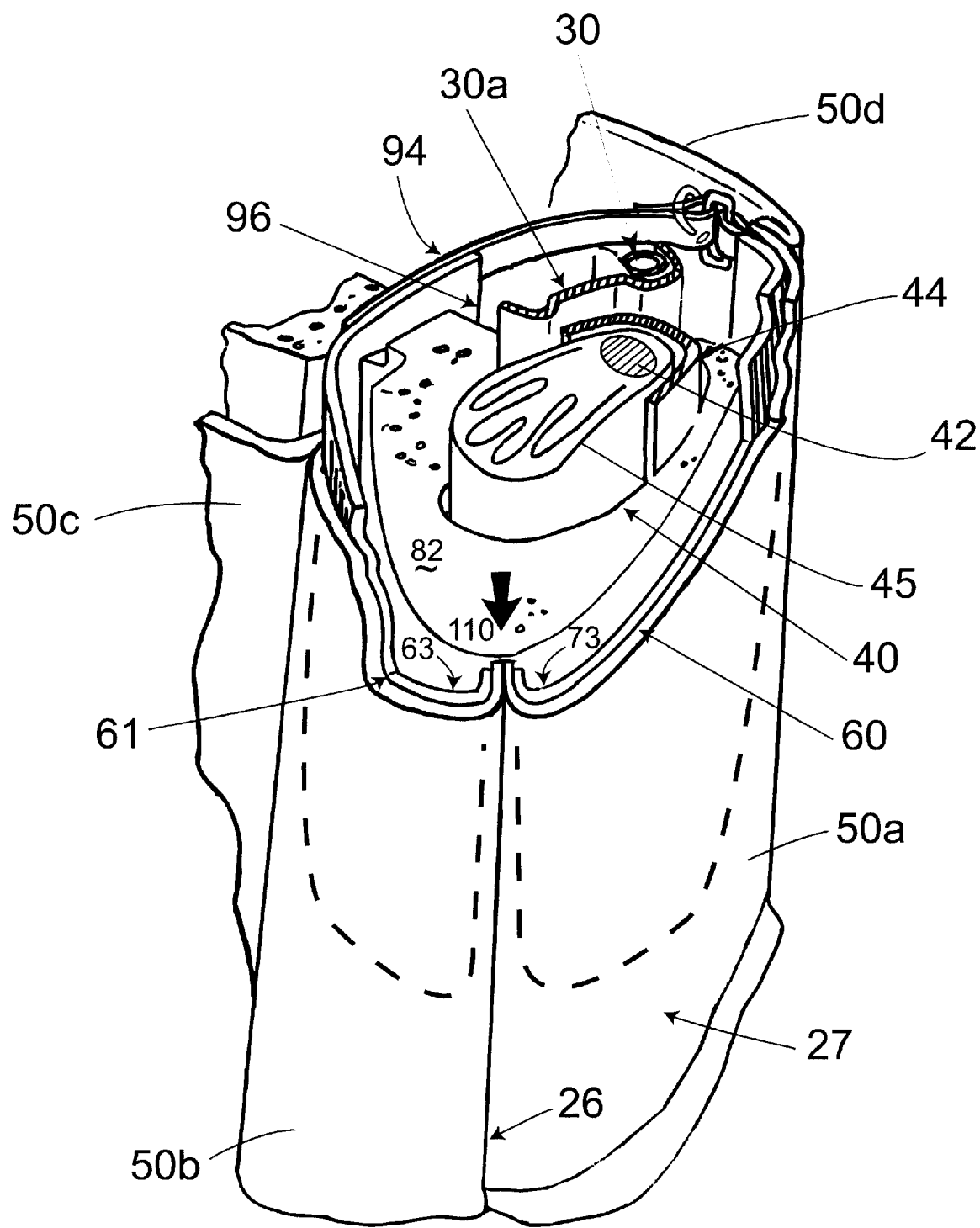
FIG. 4 illustrates a partial right side isometric view of a vehicle seat.

Reference is now made to FIGS. 2–4 which show the major components of one of the preferred embodiments of the present invention. FIG. 2 shows the general relationship between the left or outboard side wing 27 and back 22. Situated within the back and within the wing 27 are the vehicle frame parts 30 and 30a. The air bag module 40 is secured to frame part 30a. The module 40 comprises an air bag inflator 42 secured through a housing or bracket 44 to the frame part 30a. Positioned about the housing is a folded air bag 46 which is typically held in this folded configuration by a thin envelope of tearable material 45. FIGS. 2, 3 and 4 further show additional details of the construction of a typical seat, that is, a plurality of sewn-together panels 50a, 50b, 50c and 50d which cover the back 22, wing 27 and rear 28 parts of the covering material 50. The wing 24 is covered by similar panels of material. As can be seen from this construction, seam 26 is located between material panels 50a and 50b. As mentioned above, the prior art air bag constructions did not consistently deploy or permit for the deployment of the air bag through the outside seam 26. One of the reasons for this less than desirable performance can be equated to the elongation characteristics of the material used in the panels 50a and 50b, that is, the material did not focus the created stresses into the seam 26.

To ensure that the created forces are focused into the seam 26, a reinforcement panel of material 60 is sewn or otherwise attached to panel 50a and joined to panel 50a and 50b at seam 26. This reinforcement panel may be a thin strip of polypropylene, a woven cloth or a thin strip of material. In the present invention the panel 60 is made of two layers of 630 denier woven nylon fabric. The important characteristic of the reinforcement panel is that its effective coefficient of expansion is less than that of the panel 50a. Stated another way, the reinforcement panel 60 is more rigid than the panel 50a. In the preferred embodiment of the invention, the width of the reinforcement panel 60 runs from the seam 26 through to a rear end 62 of panel 50a. The length or height of the reinforcement panel (as shown in FIGS. 2 and 4) is slightly larger than the length of the air bag module.

The invention contemplates the use of a second reinforcement panel 61 which is similarly constructed to that of panel 60. As can be seen, panel 61 is secured on one side to the panel 50b and 50a and reinforcement panel 60 along seam 26. The second reinforcement panel 61 is not connected to the covering material panels other than along the seam 26. As can be seen in FIG. 3, the reinforcement panels 60 and 61 are positioned adjacent the exterior surface 80 of the foam underlining of the covering material 50 of the seat 20.

Figure 5:
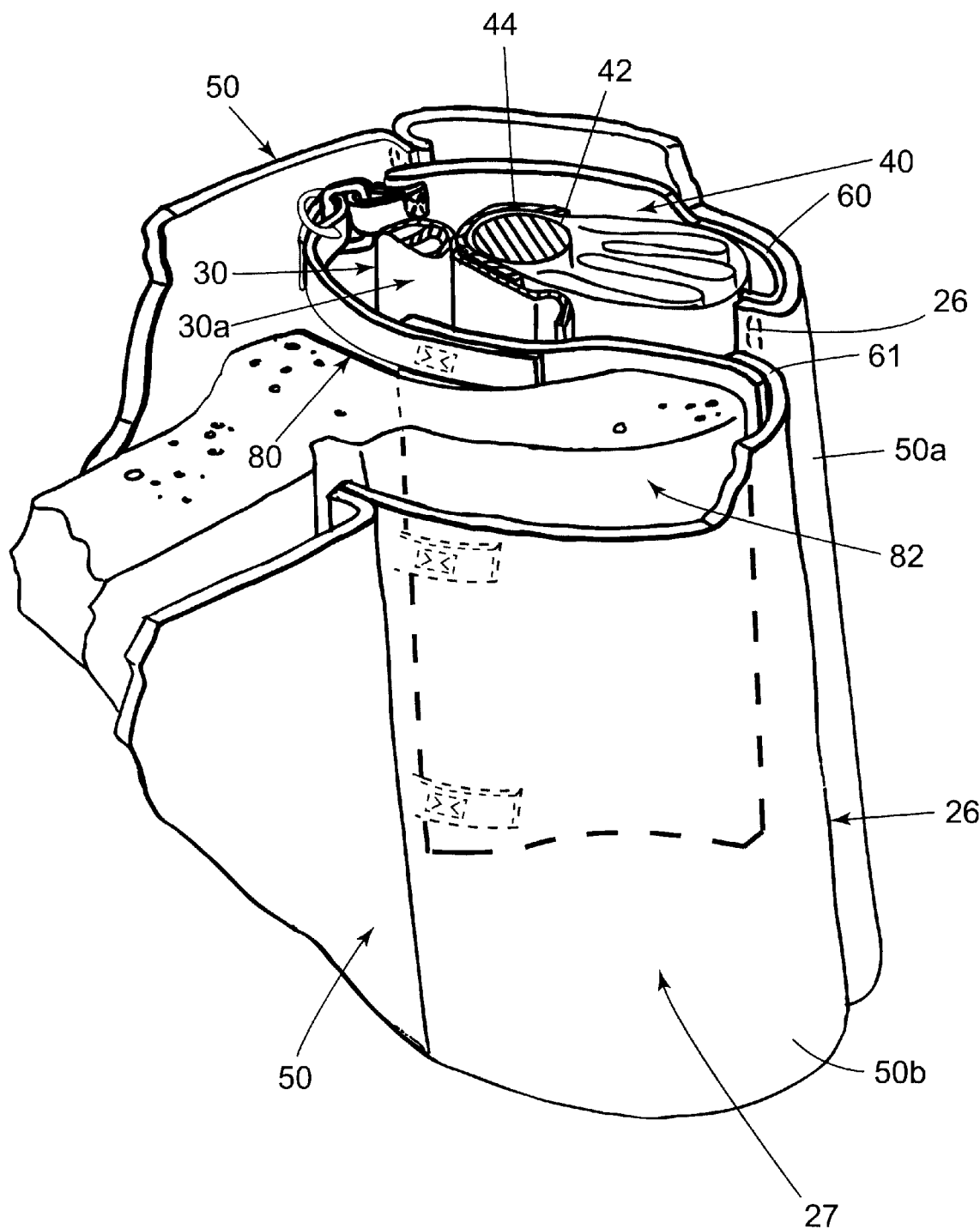
FIG. 5 shows an alternate embodiment of the invention.

Reference is briefly made to FIG. 5 which illustrates an alternate embodiment of the invention. As can be appreciated by those familiar with the construction of vehicle seats, the construction defined in FIGS. 2–4 contemplates that the foam 82 is manufactured as a pre-formed insert that is slipped about the frame 30–30a and then the covering material 50 at least for the back 22, rear 27 and wings 24 and 26 is slipped over the pre-formed foam layer. FIG. 5 is illustrative of an alternate vehicle seat construction in that the covering material 50 is molded directly to the foam layer 82 and as such the covering material and foam layer comprise an integral structure which is slipped over the associated frame parts. In any case, the construction shown in FIG. 5 will also include a covering material side panel 50a which is joined to an adjacent panel 50b at a generally vertical seam 26. One side of the second reinforcement panel 61 that would be used in the seat construction shown in FIG. 5 would similarly be attached to the seam 26.

In the present invention the reinforcement panels 60 and 61 are drawn relatively tightly together. This can be accomplished in many different ways. As illustrated in FIGS. 2–4, a plurality of loops 90 are sewn into the seam 26c between the back panel 50d and the side panel 50a. Similarly, a like plurality of straps 94 are sewn to the end 96 of panel 61. Each loop 90 has a metal ring 98 extending therefrom and the corresponding strap 94 is threaded through a corresponding one of the rings 98. Thereafter the strap is pulled taut and secured in this taut condition by a locking ring 100.

As can be seen in FIG. 3, the reinforcement panels 60 and 61 are positioned on the outside of the foam layer 82. The panels 60 and 61 are drawn relatively tight but not tight enough to deform the foam so as not to perturb the stylish exterior of the seat. The straps 94, which are generally positioned rearward of the direction of inflation (see arrow 110 of FIG. 3) also function as a means for blocking any aberrant inflation characteristics of the air bag, that is, these straps or bands prevent the air bag from inflating rearwardly into the generally hollow back portion 22 of the seat.

The operation of the embodiments illustrated in FIG. 3 and FIG. 5 are substantially identical in that in each of the embodiments, the reinforcement panels 60 and 61 essentially envelop the air bag module 40 by virtue of the straps 94 which join the ends or sides 92 and 96 of the panels 60 and 61 respectively. Upon sensing an accident by a known crash sensor and associated electronic module generates an activation signal that is communicated to the inflator 42 which causes the air bag to expand outwardly generally in the direction of arrow 110. The expanding air bag engages the forward portions 63 and 73 of panels 60 and 61. By virtue of the difference in the rate or coefficient of expansion of the panels 60 and 61 in relation to the panels 50a and 50b of the covering material 50 and in view of the loose connection between reinforcement panel 61 and panel 50b, the deployment forces of the inflating air bag will be transmitted to the panels 60 and 61 forcing them apart at the seam 26. The outwardly expanding forces input to panels 60 and 61 cause the panels 60 and 61 and 50a and 50b to tear apart at and along the seam 26.

Reference is again briefly made to FIG. 3 or 4. As known in the art, the inner side panel 50b and the back panel 50c are typically loosely positioned upon the foam 82 that forms the back 22 of the seat. Normal seat construction techniques restrict any undue motion of the inner seam by tethering this seam to a frame component such as 30b. This tethering can be accomplished in many ways. As illustrated in FIG. 4, a plurality of straps 95 (metal or woven material) join end 51 which is formed by adjacent portions of panels 50b and 50c. The ends 97 of each of the formed metal (or woven material) straps 95 are appropriately secured to the frame part 30b. As can be appreciated, the inner seam 26b or alternatively, the joined end 51 can be secured to the frame part 30b at distinct locations corresponding to the number of straps 95 used. Alternatively, a thin metal bar 120 can also be sewn to end 51 or attached to end 51. The bar 120 runs the length of the seam 26b. The bar 120 is then appropriately joined by straps (metal or woven material) to the frame part 30b. As can be appreciated, the above construction shown in FIG. 3 defines a pre-determined contour in the transition between the back 22 and the wing 27. To avoid an asymmetric construction of the seat, the straps 95 and/or the rod 120 with the straps 95 are similarly provided adjacent to the left inner seam 26c (see FIG. 1) located between the transition between the back 22 and wing 24.

Many changes and modifications in the above described embodiment of the invention can, of course, be carried out without departing from the scope thereof. Accordingly, that scope is intended to be limited only by the scope of the appended claims.

We claim:

1. A force-directing air bag deployment system comprising:

a seat (20) having at least one forwardly extending wing (27), the seat (20) covered by a covering material (50), the covering material (50) defining at least one seam which runs vertically along a forward edge of the wing (26), the covering material (50) comprising an outboard side panel (50a) and an inboard side panel (50b) joined at the seam (26);

a first reinforcement panel (60) positioned adjacent the outboard side panel 50a and joined to the side panels (50a, 50b) at the seam (26);

a second reinforcement panel (61) adjacent the inboard side panel (50d) and joined to the outboard panel (50a), the inboard panel (50b) and the first reinforcement panel (60) at the seam (26);

the first and second reinforcement panels having respective end portions, each of the end portions are joined together by a means for connecting thereby forming the first and second reinforcement panels into a general loop configuration which when subjected to tensile forces, focuses reaction forces into the seam (26) causing the seam to separate.

2. A device as defined in claim 1 including an air bag module (40) having an inflatable air bag, the air bag upon inflation creating forces tending to move the first reinforcement panel (60) apart from the second reinforcement panel (61) thereby opening the seam (26) to create a deployment opening through which the air bag can continue to inflate;

wherein upon inflation the air bag is positioned proximate and adjacent a surface of a side, interior portion of a vehicle (38) to protect a seated occupant in a side impact collision.

3. A force-directing air bag deployment system comprising:

a seat covered by a covering material, the covering material comprising a first cover panel and a second cover panel joined at adjacent respective first and second sides at a seam;

a first reinforcement panel adjacent the first cover panel and operatively joined to the first cover panel proximate the first side;

a second reinforcement panel adjacent the second cover panel and operatively joined to the second cover panel proximate the second side;

wherein the first and second reinforcement panels have respective end portions opposite the location to which they are joined to the cover panels;

connecting means for connecting the end portions forming the first and second reinforcement panels into a general loop configuration which when subjected to tensile forces, focuses reaction forces into the seam (26) causing the seam to separate.

4. The device as defined in claim 3 including an air bag module (40) having an inflatable air bag, the air bag upon inflation creating forces tending to move the first reinforcement panel (60) apart from the second reinforcement panel (61) thereby opening the seam (26) to create a deployment opening through which the air bag can continue to inflate;

wherein upon inflation the air bag is positioned proximate an adjacent surface of a side, interior portion of a vehicle (38) to protect a seated occupant in a side impact collision.

5. The device as defined in claim 3 wherein at least one of the first and second cover panels includes an underlayer of foam.

6. The device as defined in claim 3 wherein the connecting means includes at least one adjustable strap.

7. The device as defined in claim 3 wherein the second reinforcement panel is connected to the second cover panel only proximate the second side.

8. The device as defined in claim 3 wherein the second cover panel includes an edge generally opposite the seam and wherein the edge is tethered to a part of a seat frame.

* * * * *